(12) United States Patent
Uptergrove et al.

(10) Patent No.: US 8,876,979 B2
(45) Date of Patent: Nov. 4, 2014

(54) RECYCLABLE PRINTED PLASTIC CONTAINER AND METHOD

(75) Inventors: Ronald L. Uptergrove, Northville, MI (US); Brent Mrozinski, South Lyon, MI (US)

(73) Assignee: Plastipak Packaging, Inc., Plymouth, MI (US)

(*) Notice: Subject to any disclaimer, the term of this patent is extended or adjusted under 35 U.S.C. 154(b) by 0 days.

(21) Appl. No.: 13/168,181

(22) Filed: Jun. 24, 2011

(65) Prior Publication Data

US 2011/0247654 A1  Oct. 13, 2011

Related U.S. Application Data

(63) Continuation-in-part of application No. 12/581,952, filed on Oct. 20, 2009.

(60) Provisional application No. 61/360,512, filed on Jul. 1, 2010, provisional application No. 61/106,860, filed on Oct. 20, 2008.

(51) Int. Cl.
  *B08B 7/04* (2006.01)
  *B41M 5/00* (2006.01)
  *B65D 23/08* (2006.01)

(52) U.S. Cl.
  CPC ........... *B41M 5/0047* (2013.01); *B41M 5/0088* (2013.01); *B65D 2203/00* (2013.01); *B65D 2565/385* (2013.01); *B65D 23/0814* (2013.01)
  USPC ........ 134/6; 134/26; 134/28; 134/30; 134/40; 134/42; 264/233; 264/344

(58) Field of Classification Search
  USPC ......... 134/6, 26, 28, 30, 40, 42; 264/233, 344
  See application file for complete search history.

(56) References Cited

U.S. PATENT DOCUMENTS

| | | |
|---|---|---|
| 3,417,175 A | 12/1968 | Brown et al. |
| 3,490,363 A | 1/1970 | Derrickson |
| 3,999,190 A | 12/1976 | Brown et al. |
| 4,519,310 A | 5/1985 | Shimizu et al. |
| 5,011,862 A | 4/1991 | Melber et al. |
| 5,182,571 A | 1/1993 | Creagh et al. |
| 5,587,405 A | 12/1996 | Tanaka et al. |
| 5,634,405 A * | 6/1997 | Bose et al. ............... 101/483 |

(Continued)

FOREIGN PATENT DOCUMENTS

WO  WO 03/002349 A2  1/2003

OTHER PUBLICATIONS

IARC, 1987. N-Vinyl-2-Pyrrolidone and Polyvinyl Pyrrolidone, IARC Monographs Supplement 7, pp. 1181-1187.

(Continued)

*Primary Examiner* — Bibi Carrillo
(74) *Attorney, Agent, or Firm* — Dykema Gossett PLLC

(57) ABSTRACT

A recyclable article having an external surface with an image printed thereon by droplets of ink is provided. The droplets of ink comprise a composition that includes a hydrophilic component. In embodiments, the hydrophilic component can facilitate the separation or loosening of the image from the external surface of the container when the image is exposed to a liquid-based solution at an elevated temperature. Methods for facilitating recycling of recyclable articles having printed images are also disclosed.

9 Claims, 2 Drawing Sheets

| Adhesion Score | Test 1 | Test 2 | Test 3 | Test 4 |
|---|---|---|---|---|
| 9 | Pass | Pass | Pass | Pass |
| 8 | Fail | Pass | Pass | Pass |
| 7 | Pass | Pass | Pass | Fail |
| 6 | Fail | Pass | Pass | Fail |
| 5 | Pass | Pass | Fail | Fail |
| 4 | Fail | Pass | Fail | Fail |
| 3 | Fail | Fail | Pass | Pass |
| 2 | Fail | Fail | Pass | Fail |
| 1 | Fail | Fail | Fail | Fail |

(56) References Cited

U.S. PATENT DOCUMENTS

| | | | |
|---|---|---|---|
| 5,705,257 A | 1/1998 | Froh et al. | |
| 5,712,022 A * | 1/1998 | Tanaka et al. | 428/195.1 |
| 5,753,325 A | 5/1998 | McDaniel et al. | |
| 5,792,278 A * | 8/1998 | Wojcik | 134/38 |
| 5,858,514 A | 1/1999 | Bowers | |
| 5,984,456 A | 11/1999 | Bern | |
| 6,002,844 A | 12/1999 | Kishida et al. | |
| 6,082,563 A | 7/2000 | Kohn et al. | |
| 6,135,654 A | 10/2000 | Jennel | |
| 6,147,041 A | 11/2000 | Takahashi et al. | |
| 6,194,043 B1 | 2/2001 | Fehn | |
| 6,314,875 B1 | 11/2001 | Steenbergen | |
| 6,406,115 B2 | 6/2002 | Mantell et al. | |
| 6,409,294 B1 | 6/2002 | Zimmermann et al. | |
| 6,460,991 B1 | 10/2002 | Temple | |
| 6,513,435 B2 | 2/2003 | Detzner | |
| 6,663,929 B1 | 12/2003 | Tabota et al. | |
| 6,682,191 B2 | 1/2004 | Temple | |
| 6,706,342 B2 | 3/2004 | Kong et al. | |
| 6,769,357 B1 | 8/2004 | Finan | |
| 7,128,406 B2 | 10/2006 | Dixon et al. | |
| 7,182,418 B2 | 2/2007 | Harvey et al. | |
| 7,423,072 B2 * | 9/2008 | Lee et al. | 522/96 |
| 7,579,388 B2 | 8/2009 | Kiefer | |
| 2002/0086914 A1 | 7/2002 | Lee et al. | |
| 2002/0097280 A1 | 7/2002 | Loper et al. | |
| 2005/0211371 A1 | 9/2005 | Hirst et al. | |
| 2005/0232962 A1 * | 10/2005 | Vrijhof | 424/423 |
| 2006/0162846 A1 * | 7/2006 | Roach et al. | 156/116 |
| 2006/0250464 A1 | 11/2006 | Sheinman | |
| 2007/0264454 A1 | 11/2007 | Uptergrove | |
| 2008/0038570 A1 * | 2/2008 | Satou et al. | 428/483 |
| 2008/0117248 A1 | 5/2008 | Uptergrove | |
| 2009/0160901 A1 | 6/2009 | Achhammer | |
| 2010/0096386 A1 * | 4/2010 | Uptergrove et al. | 220/62.11 |
| 2010/0330296 A1 * | 12/2010 | Loccufier et al. | 427/511 |

OTHER PUBLICATIONS

PCT/ISAUS, International Search Report and Written Opinion issued in counterpart PCT/US2011/042193. Date of Mailing: Oct. 28, 2011.

* cited by examiner

| Adhesion Score | Test 1 | Test 2 | Test 3 | Test 4 |
|---|---|---|---|---|
| 9 | Pass | Pass | Pass | Pass |
| 8 | Fail | Pass | Pass | Pass |
| 7 | Pass | Pass | Pass | Fail |
| 6 | Fail | Pass | Pass | Fail |
| 5 | Pass | Pass | Fail | Fail |
| 4 | Fail | Pass | Fail | Fail |
| 3 | Fail | Fail | Pass | Pass |
| 2 | Fail | Fail | Pass | Fail |
| 1 | Fail | Fail | Fail | Fail |

RECYCLABLE PRINTED PLASTIC CONTAINER AND METHOD

CROSS-REFERENCE TO RELATED APPLICATION

This application is a continuation-in-part of U.S. patent application Ser. No. 12/581,952, filed Oct. 20, 2009, which claims the benefit of U.S. Provisional Application No. 61/106,860, filed Oct. 20, 2008, and the instant application now further claims the benefit of U.S. Provisional Patent Application No. 61/360,512, filed Jul. 1, 2010, all of the foregoing hereby incorporated by reference as though fully set forth herein.

TECHNICAL FIELD

The present invention relates generally to plastic articles having digital images printed thereon, including plastic containers having digital images with improved adhesion and/or recycling characteristics, as well as methods for facilitating recycling.

BACKGROUND

The plastic container industry continues to employ ever increasing amounts of recycling. Container manufacturers have recently started producing containers with digitally printed labels that are of a sufficient definition and quality to compete with and potentially replace prior conventional labeling techniques. Examples of such printing techniques are described in commonly-owned U.S. Pat. Nos. 7,625,059 and 7,736,713, which are incorporated herein in their entirety by reference.

Potential challenges arise introducing containers with digitally printed labels into conventional container recycling processes. Some challenges have been mentioned and discussed in U.S. patent application Ser. No. 12/581,952, which is also incorporated herein in its entirety by reference. There is a clear trend amongst container manufacturers, brand owners, end users, and governmental entities to improve and increase plastic container recycling efforts. Consequently, it is desirable to provide industry-acceptable articles that are sufficiently compatible with the current recycling infrastructure and processes, or that provide sufficient incentive and/or volumes to effectuate industry-wide changes. At least initially, it would be desirable to provide digitally printed articles that are recyclable using current industry standard processes—i.e., processes that commonly include caustic high-temperature washing and grinding. As such, there is a desire for digitally printed plastic articles, such as containers, that have digital images that adhere to the article without quality issues throughout its useful life, but are more readily removable during plastic recycling processes.

SUMMARY

A recyclable plastic article is disclosed that has an external surface with a digital image printed thereon by cured droplets of ink. The droplets of ink may be monomer-based and can comprise a composition of ink that includes a removal-promoting additive. The removal-promoting additive, which may comprise a hydrophilic and/or an acidic component, may be configured or composed to cause the cured droplets of ink to separate or loosen from the external surface of the article when the digital image is exposed to a liquid-based (e.g., water-based) solution at or about a predetermined elevated temperature. Such predetermined elevated temperature may, without limitation, include those associated with conventional recycling processes. Embodiments of method for facilitating such recycling are also disclosed.

BRIEF DESCRIPTION OF THE DRAWINGS

Embodiments of the invention will now be described, by way of example, with reference to the accompanying drawings, wherein:

FIG. 2 is general representation of a quality review table/matrix that may be used to evaluate the acceptability of a printed image on a plastic article.

DETAILED DESCRIPTION

Figure 1:
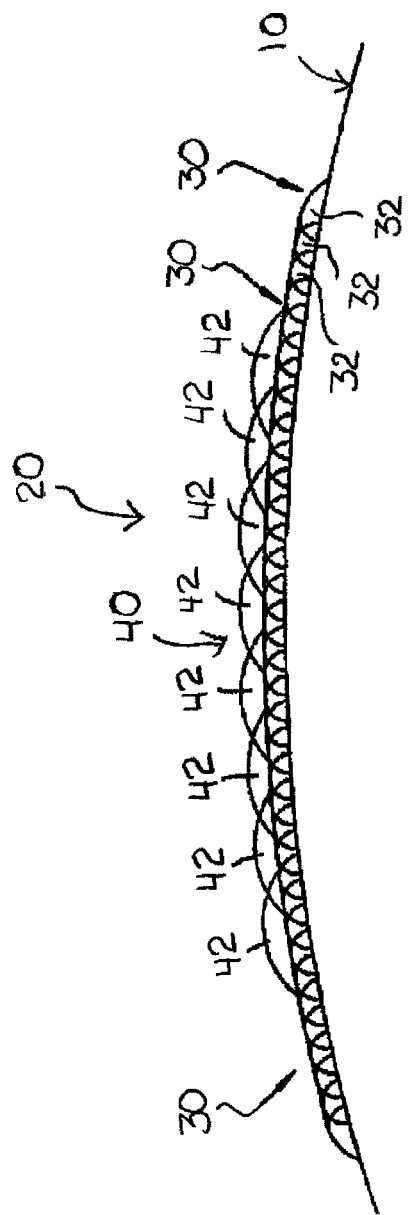
FIG. 1 generally illustrates a side view of a portion of a plastic container with an embodiment of a digital image printed thereon.

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

For general context, and without limitation, a portion of a surface 10 of a plastic article (e.g., a container) with an embodiment of a printed image 20 is generally illustrated in FIG. 1. The illustrated embodiment of the image 20 includes a base coat 30 that may be comprised of a plurality of base coat ink droplets 32, and may also include a secondary coat 40 that can be comprised of a plurality of secondary coat ink droplets 42.

Containers (which include bottles) associated with the present disclosure are comprised of a plastic material or resin (e.g., acrylonitrile-butadiene-styrene (ABS), polyethylene terephthalate (PET), polystyrene (PS), polyethylene (PE) (including high-density polyethylene (HDPE)), polypropylene (PP), polyvinyl chloride (PVC), etc.). Further, the containers may be mono-layer or multi-layer containers, and can be formed using various conventional forming techniques including, without limitation, injection molding, blow molding, thermoforming, etc. In an embodiment, the outermost layer/surface may be comprised of a virgin plastic material. Although, it is noted that containers in accordance with the teachings of the disclosure may also include some percentage of recycled content, including a percentage of recycled content in the outer layer of the container.

In embodiments, the article (e.g., container) may include a first coat, or base coat (e.g. base coat 30 shown in FIG. 1). The base coat 30 may be comprised of a plurality of base coat ink droplets 32 that are printed (e.g., digitally printed, such as by a drop-on-demand ink jet process) on an exterior surface of the article and are subsequently cured or permitted to cure. The ink may be UV curable ink, which is curable by UV radiation that can be applied by various known means, including but not limited to UV or LED lamps. The ink droplets may be monomer-based and comprised of an ink composition that serves to improve the application of the ink droplets (e.g., provides good processing characteristics for printing) and/or provides a visual characteristic (e.g., color or texture). For embodiments, the base coat 30 may comprise white and/or colorless portions. Moreover, with disclosed ink droplets, i.e., those that are monomer-based, curing can cause the ink droplets to polymerize. Because the inks that are employed are not solvent-based, the ink can be composed so that during recycling processes the ink does not bleed in solutions and give off volatiles, as solvents might. It is noted that the U.S. Environmental Protection Agency (EPA) has promulgated guidelines for solvents; however, polymers are solid and do not flash off or give off volatiles. That is, the separation of inks such as disclosed herein can be mechanical in nature, as the ink is in a cured polymer state and may be a physically removed (e.g., in the form of flakes or film), rather than being included as part of a chemical dissolution.

Further, in accordance with teachings of the present disclosure, the ink composition that makes up the ink droplets may include a removal-promoting additive. The "removal-promoting additive" comprises at least one hydrophilic component or acidic component. Hydrophilic components may comprise one or more composition elements that exhibit hydrophilic (water-loving) properties. Acidic components may comprise one or more composition elements that exhibit acidic properties. For some embodiments, the removal-promoting additive will comprise a combination of hydrophilic and acidic components—i.e., at least two removal promoting additives. For some ink droplet compositions a "dual" composition, in which the removal-promoting additive comprises both hydrophilic and acid components, a lesser percentage of weight (to total) may be used to provide comparable results to the use of composition with just a single additive.

Such hydrophilic components may include hydrophilic monomers, hydrophilic oligomers, and water dispersible monomers that provide the desired functionality. Hydrophilic monomers are often characterized as having oxygen or nitrogen atoms, in addition to halogens, in their backbone structure. Such monomers are commonly prone to attack by polar solvents such as water and keytones. Hydrophilic monomers also tend to have a lesser resistance to thermal degradation. Consequently, the inclusion of one or more hydrophilic components in the associated ink droplets can, at a later point (such as the point of post-use recycling), improve the separation of the image (i.e., the cured ink droplets) from the plastic structure of the article. By way of example and without limitation, in a cured state, the hydrophilic portion of a polymer will typically absorb water. When this occurs, the water may act as a plasticizer, increasing the mobility of the polymer's chains. The increased mobility can soften the polymer, making it more susceptible to removal. As such, the exposure of a plastic article, such as a container, including an image comprised of an ink composition with a removal-promoting additive (e.g., hydrophilic monomer) to a liquid-based solution (e.g., agitated water) at an elevated temperature will promote the softening of the ink composition (i.e., hydrophilic monomer) and the separation of the image from the plastic material. The elevated temperature may be predetermined, and may be a temperature that is above the temperature that the article will typically encounter in normal use. Moreover, to the extent desired, an adhesion-separation threshold may be established such that the softening and subsequent removal substantially only occurs at elevated temperatures (e.g., during a recycling process), and is substantially prevented during normal intended use. It is noted that aliphatic urethane acrylates are a general class of hydrophilic monomers that generally absorb water and may potentially be used as a hydrophilic component. Moreover, provided that they are appropriately viscous (i.e., not too viscous) for ink jet/digital print application, some hydrophilic oligomers may also be used as a hydrophilic component.

Without limitation, for some embodiments, the removal-promoting additive may include hydrophilic monomers with a percent weight as to the total weight (i.e., of the associated ink and the removal-promoting additive) within the range of near 0% to as much as 20% by weight. For some embodiments, the percent weight of the removal-promoting additive will fall within the range of near 0 to 10% of the total weight. Without limitation, an example of a hydrophilic monomer that may be employed is methoxy polyethylene glycol monoacrylate (e.g., CD 553, commercialized by Sartomer USA, LLC (Sartomer)).

It is noted that some water dispersible monomers are also hydrophilic and appear to absorb water when cured. With such a composition, the water may act as a plasticizer and soften the cured ink composition (e.g., a cured ink film on the surface of a container), making it easier to remove the ink film during recycling processing. With embodiments of the disclosure, the inclusion of an appropriate hydrophilic component to the ink composition can add a hydrophilic quality to the ink, while maintaining the jet-ability and adhesion of the ink to the article substrate throughout the useful life of the article.

Acidic components include acidic monomers that have a measurable acidic value. It is noted that the measurable quantity may be based on pH, acid weight percentage, or titrated value of an alkaline chemical (e.g., mg KOH/g [milligrams of potassium hydroxide per gram of monomer]). Further, for example, in a cured state, the acidic portion of the polymer may be vulnerable to a caustic solution. A reaction between the acidic functionality of the polymer chain and the alkalinity of the solution can yield a decrease in adhesion to the applied substrate, promoting the separation of the polymer. Without limitation, examples of acidic monomers that may be employed include acidic acrylate oligomer (e.g., CN 147, commercialized by Sartomer) and monofunctional acid ester (e.g., CD 9050, commercialized by Sartomer). For instance, when a container involving an acidic component is put into contact with a wash (e.g., a conventional-type caustic wash), associated bonds may be broken, promoting an intended separation of the printed image (droplets of ink) from the plastic substrate.

By way of example, and without limitation, an embodiment of a polyethylene terephthalate (PET) container including UV-cured printed ink having a blended removal-promoting additive was subjected to ink-removal testing. The blended removal-promoting additive of the tested containers included acidic monomers of the type noted above, i.e., acidic acrylate oligomer and/or monofunctional acid ester. The containers may be subjected to a bath solution comprising a pH level of at least 9.0, which can assist label removal as generally known in the art of plastic container recycling, with the solution being heated to approximately 85° C. Various samples were exposed to such conditions for 12 minutes, and were evaluated on a scale of 0 to 5 as follows:

0—No improvement in removal relative to the control sample
1—Minimal improvement observed, removal obtained in only some areas through abrasion with a metal object
2—Some improvement observed, the entire film could be removed by scratching with a metal object
3—Cured ink film was removable by scratching with a fingernail
4—Cured ink film was easily removable simply by wiping with a clean wipe
5—Cured ink film fell off during wash test.

The testing was intended to, among other things, identify solutions that provided a removal performance level of 4 or 5. However, a level of at least 4 is not necessarily a requirement, and for some applications a lower removal level may also be acceptable. The results of the testing indicated that the inclusion of the removal-promoting (acidic) additives blended into the ink composition provided a significant improvement in the removal of the cured ink from the plastic (PET) material. While both forms of acidic additives exhibited an improvement promoting ink removal, with the instant test configuration, a somewhat lesser compositional percentage of the acidic acrylate oligomer, as opposed to the monofunctional acid ester (10% versus 15%, respectively), was used to obtain at least a level 4 removal level.

In embodiments, the ink composition may optionally include a hydrophobic component. That is, the ink composition may, for example, include hydrophilic and hydrophobic components. Hydrophobic components may include hydrophobic (water-hating) monomers. The hydrophobic properties generally relate to polarity. A number of hydrophobic monomers are characterized as having an organic backbone structure composed primarily of hydrogen and carbon; and thus, such monomers tend to be non-polar and offer resistance to polar solvents (such as water and alcohols), as well as to acids and bases. For such dual-component embodiments, the ink composition should strike a balance between the hydrophilic and hydrophobic components (e.g., hydrophilic monomers and hydrophobic monomers). The hydrophobic monomers may help keep the ink drops adhered to the article substrate, and the hydrophilic monomers may help soften (and even separate) when the image is exposed to a recycling process/bath (e.g., agitated water at an elevated temperature).

For an embodiment of a container with an image printed thereon, at least a first base coat 30 (which may include a hydrophilic component) may be applied to a surface of a container at a first time $t_1$ and at a first temperature $T_1$. The temperature $T_1$ will be in the range of temperatures that are appropriate for application of the associated base coat. In an embodiment, the base coat 30 may be curable (e.g., ultraviolet (UV) curable), and further may be cured prior to an application of a secondary coat.

For some embodiments, a secondary coat 40 may be comprised of a plurality of secondary coat ink droplets 42 that are distributed on at least a portion of the base coat 30. Further, if desired, additional layers of "secondary" coats (e.g., a tertiary layer, etc.) may also be applied on the secondary coat 40. With embodiments of the disclosure, the secondary coat ink droplets 42 may also be comprised of an ink composition including a hydrophilic component.

A plurality of secondary coat ink droplets 42 may collectively form a part of an application pattern which, in turn, may form all or a portion of an image. Furthermore, as generally illustrated in FIG. 1, portions of one or more adjacent secondary coat ink droplets 42 may overlap or intermix with each other. The secondary coat 40, and the constituent secondary coat ink droplets 42, may comprise various known colors, including without limitation, primary printing colors such as cyan, magenta, and yellow. Further, controlling the overlapping of or combinations of certain colors in certain areas can provide additional "process" colors. Additionally, the secondary coat ink droplets 42 may be curable. For example, UV curable secondary coat ink droplets may comprise all or a portion of the intended image. Where curing is accomplished by radiation, the ink composition may include a photo initiator. It is additionally noted that cured ink on a container surface may be primarily held by two bonds—i.e., a polar bond between the ink polymer and the plastic, and a mechanical bond due to the plastic surface having an uneven surface at a microscopic level (e.g., microstructures). For a number of embodiments of the present disclosure, it is best to attack both bonds. For some applications, a hydrophilic component may work better on mechanical bonds, while an acidic component may work better on polar bonds. Depending upon the application, the secondary coat ink droplets can vary in diameter, which can range, for instance, from about 10 microns to about 200 microns. The secondary coat 40 may be applied to a surface 10 of a container at a second time $t_2$ and at a second temperature $T_2$, wherein the second temperature $T_2$ at which the secondary coat 40 is applied is typically less than the first temperature $T_1$ at which the base coat 30 is applied.

In embodiments of the invention, the time between application of a base coat and the application of a secondary coat (e.g., $t_2$ minus $t_1$) may be reduced—for example, to as little as ten seconds or less. For some embodiments, the application time differential will be within two to six seconds. Moreover, in embodiments, the application temperature differential between the temperature at which the base coat 30 is applied and the temperature at which a secondary coat 40 is applied to a portion of the base coat 30, i.e., $T_1$ minus $T_2$, may be controlled to be equal to or less than about 10° F. For some embodiments, the application temperature differential will be within about 5° F. to about 10° F. Moreover, for some applications, it may be desirable to modify the temperatures associated with the application of the base coat 30 and the secondary coat 40 so that the respective application temperatures are closer together—i.e., so that the temperature differential between the applied coats is reduced or minimized. This can be accomplished, for instance, by (a) lowering/decreasing $T_1$, (b) raising/increasing $T_2$, or (c) a combination of (a) and (b). Such aforementioned time and/or temperature control with respect to the base coat and secondary coat can provide for better adhesion of the resulting printed image with respect to the article.

It is noted that in addition to time and temperature, irradiance is a factor that can also affect the effective cure rate for a printed image. That is, with certain times (e.g., $t_1$ and $t_2$) and temperatures (e.g., $T_1$ and $T_2$), there may be an associated irradiance—i.e., $\epsilon_1$ and $\epsilon_2$. For example, in embodiments a base coat may be cured at irradiance $\epsilon_1$, and an associated secondary coat may be cured at irradiance $\epsilon_2$. Further, in embodiments, the effective cure rate—which may be based on a combination of time, temperature, and irradiance—the irradiance may generally be provided by the following equation:

$$\text{Irradiance}(\epsilon) = (d\phi/dA)$$

where, $\phi$ = irradiant flux (measured in watts), and
$A$ = area $(cm^2)$

For example, without limitation, the range of irradiance for some embodiments will be between about 0.1 watts/cm$^2$ and about 10.0 watts/cm$^2$.

For some applications, such as where a curable ink (e.g., a UV-curable or radiation-curable ink) is used, the relevant coat or ink may be cured after each respective print station. For example, without limitation, an embodiment of a process may, at least in part, comprise: application of base coat; cure step; application of secondary coat; and cure step. Alternatively, also by way of example and without limitation, the process may, at least in part, comprise: application of base coat; cure step; application of base coat; cure step; application of secondary coat, and cure step. Moreover, for embodiments of the invention, it can be desirable for the production/subsequent handling rate of containers/bottles to match or substantially match the flow/processing rates of the associated printing machine(s).

Further, it has been found that the quality of printed images may be, at least in part, controlled and/or improved through one or more of the following techniques:

(a) selection and/or calibration of ink sets;
(b) control of substrate (i.e., container surface) temperature; and/or
(c) timing control.

With respect to the selection and/or calibration of ink sets, this is accomplished, at least in part, by the selection and/or calibration of the inks comprising the base and secondary coats. It has been discovered that the inks used can be selected to provide desired time and/or temperature characteristics, including relative to one another in combination. For example, selection of certain inks having given viscosities can exhibit or provide certain desired temperature related effects.

With regard to the control of the substrate (i.e., container surface) temperature, the temperature of a relevant portion of a sidewall (or other portion of a container) can be treated or controlled to some measure. For example a given portion of the container can be pre-treated. Such pre-treatment can be facilitated using various known techniques that may include, without limitation, flame, corona, and plasma treatment. However, the invention is not limited to those specific pre-treatment techniques.

With respect to timing control, the time associate with the movement of containers, for instance through a production machine, as well as the timing of the applications of the base coat and/or secondary coat, can be controlled. It can be desirable for the production/subsequent handling rate of containers/bottles to match or substantially match the flow/processing rates of the associated printing machine(s).

The present disclosure may also include a system for assessing or evaluating the "acceptability," such as the commercial acceptability, of a container having a printed image—such as a digitally printed label. That is, for embodiments of the invention, the system for assessing or evaluating can provide an "adhesion score." FIG. 2 generally represents a quality review table/matrix that can be used to assess or evaluate the acceptability of a printed image on a container. As generally shown, the Y-axis may involve numbers associated with an overall pass-or-fail score. In the illustrated embodiment, numbers 1 through 5 indicate that the containers are not acceptable, while numbers 6 through 9 indicate that the associated containers are acceptable. It is important to note that while a score of at least a 6 will "pass" as acceptable with respect to the instant table/matrix, the invention is not limited to the specific table/matrix shown and, alternatively, more scores could be provided for and/or the passing score could be raised or lowered as desired or necessary. A plurality of tests—which may include various standard tests, including those previously noted—are represented in the columns provided on the X-axis. For example, without limitation, Test 1 may include a "Sutherland Rub Test," Test 2 may comprise a "3M #610 Tape Test," Test 3 may include a "Simulated Ship Test," and Test 4 may comprise a "3M #810 Tape Test." As generally shown in the table, various pass-or-fail designations may be represented on the table in connection with each noted Test. With respect to several of the aforementioned "standard" tests, the tests may be modified as appropriate for use in connection with a printed image as opposed to a traditionally applied label. For instance, with various "tape" tests, which may follow the ASTM D 3359-08 standards, the tests associated with the table/matrix may or may not involve the cutting of the image portion with a cutting tool prior to applying a pressure sensitive tape. That is, in an embodiment, "Test 2" may involve a "modified" 3M #610 Tape Test in so far as the portion of the image portion of a container that is subjected to testing may not be cross-cut or otherwise separated from the container. Moreover, with the table set forth in FIG. 2, an indication of a "pass," with respect to tape tests directly practicing the modified ASTM standard (i.e., the test does not involve cross-cutting/separation) would generally be represented by any removed portions being no larger than 2.0 mm$^2$. With respect to tape tests directly practicing the ASTM standard, an indication of "pass" would generally be a classification "4B" or "5B" (under the ASTM FIG. 1 Classification of Adhesion Test Results), or would involve less than 5% of the printed area removed.

In an embodiment, it is desirable to provide a container with a printed image (e.g., digitally printed image) that, at a minimum, passes a modified 3M #610 tape test and is nonetheless "recyclable." A digital image that is printed on a container is considered to be "recyclable" if it would achieve less then a "4B" classification (i.e., 5% of more of the area is removed) employing an ASTM D 3359 standard #810 tape test. A container with a digital image that passes Test 2 (modified 3M #610 Tape Test) and Test 3 (Simulated Ship Test), yet fails Test 4 (3M #810 Tape Test), would achieve an adhesion score of either 6.0 or 7.0. Such a container with a printed image having an adhesion score of 6.0 or 7.0 is commercially suitable for shipment (i.e., passing a Simulated Ship Test) while providing an adhesion associated with the printed image that is sufficient for normal/intended use but is favorably separable for subsequent recycling. Stated differently, the adhesion associated with the configured digital image is sufficiently strong for intended use but does not impede separation during recycling.

With respect to such a table/matrix, each test may be conducted on a adequate (e.g., statistically significant or representative) sampling of containers. After all tests are completed, results may be tabulated and entered into the table/matrix, to provide an "adhesion" score. The associated score outcomes can then be correlated.

Among other things, the teaching of the present disclosure can provide for improved recyclability. Recycling inks printed on various articles in an effective manner can provide a number of cost and efficiency benefits, as well as providing benefits to the environment. For example, without limitation, containers with digitally printed images (which may be formed by cured UV or radiation curable ink) that are comprised, at least in part, of an ink composition including a hydrophilic and/or an acidic component can be conveniently removed in connection with conventional plastic recycling processes. Industry standard recycling process of plastic containers conventionally include grinding containers into granulated plastic flakes, subjecting these flakes to a high-heat caustic wash process, drying the cleaned flakes, sorting, and extruding into resin pellets for resale. With embodiments that embody aspects of the disclosed teachings, digital image on the container may remain with the resin flakes after the grinding process, the digital image will be substantially separated from the resin flakes during the high-heat caustic wash process, which may be agitated, thereby not contaminating the clean resin flakes to be formed into resin pellets.

With separation techniques, the are at least four methodologies that can be employed—alone or in various combinations—to attack polar and/or mechanical bonds to promote the removal of the ink from the article. The techniques include those using: (1) water or liquid-based solutions (e.g., for additives with hydrophilic components); (2) caustic components (e.g., for additives with acidic components)—i.e., chemical reactions may be used to release polar bonds; (3) heat or temperature; and/or (4) mechanical force (e.g., high pressure spray (psi)).

The disclosure envisions a number of recycling processes that may be used to remove the ink from the article. For example, one embodiment of a method for recycling plastic containers comprises: providing a plastic container having a digital image, the ink composition including a removal-promoting additive (e.g., a hydrophilic or acidic component); and exposing the digital image to a liquid-based solution— e.g., water with or without a caustic component)—at an elevated temperature; optionally agitating the solution. Before or after the exposure, the container may be subject to a grinding operation. Similar embodiments may be said to be along the lines of including dry grind, elutriate, wash, dry, and elutriate.

Another process, which may be more similar to conventional industrial recycling and is commercially available (for example, from SOREMA (Italy)), may be said to involve a single wash, wet grinding, centrifuge, sorting, and float tank/separation. A "single wash" may, for instance, be employed by having bottles conveyed (e.g. by a set screw or multi-screw system) through a high-pressure wash (e.g., a high-temperature caustic wash). This can add a mechanical force component to assist with label removal. Typically, the bottles are whole—that is, not ground prior to such a wash. Materials, including polymerized inks, may be washed away and fall into a collection or grating system below the conveying mechanism.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A method for removing cured ink from a plastic container having an image that is digitally-printed by a drop-on-demand ink jet process, the method comprising:

providing a plastic container having a curved external surface with a digital image printed directly on the curved external surface of the plastic container by a drop-on-demand ink jet printing process, the image comprising cured droplets of ink applied directly to the curved external surface of the plastic container and having an adhesion score of at least 6.0 and up through about 9.0, and the droplets of ink comprising a composition including a removal-promoting additive;

exposing at least a portion of the digitally printed image of the plastic container to a liquid-based solution at an elevated temperature, wherein the elevated temperature is at least about 85° C.; and removing at least a portion of the digitally printed image from the curved external surface on which the image was printed.

2. The method of claim 1, wherein the removal-promoting additive comprises a hydrophilic component.

3. The method of claim 1, wherein the removal-promoting additive comprises an acidic component.

4. The method of claim 1, wherein the elevated temperature is at least about 85° C., and is predetermined.

5. The method of claim 1, including scratching or wiping the ink from the container after exposure of the image to the liquid-based solution.

6. The method of claim 1, wherein the ink is mechanically removed in the form of flakes or film.

7. The method of claim 1, wherein the plastic container comprises a plastic bottle.

8. The method of claim 1, wherein the liquid-based solution has a pH level of at least 9.0.

9. A method for removing cured ink from a plastic container, the method comprising:

using a drop-on-demand ink jet process to digitally print an image on an external surface of a plastic container, the image comprising cured droplets of ink and having an adhesion score of at least 6.0 and less than about 9.0, and the droplets of ink comprising a composition including a removal-promoting additive;

exposing at least a portion of the digitally printed image of the plastic container to a liquid-based solution at an elevated temperature, the elevated temperature is at least about 85° C.; and removing at least a portion of the digitally printed image from the external surface on which the image was printed.

* * * * *